United States Patent
Swope et al.

(10) Patent No.: US 11,348,273 B2
(45) Date of Patent: May 31, 2022

(54) DATA CAPTURE SYSTEM

(71) Applicant: ZEBRA TECHNOLOGIES CORPORATION, Lincolnshire, IL (US)

(72) Inventors: Charles Burton Swope, Coral Springs, FL (US); Stanko Jelavic, Davie, FL (US); Miguel X. Gines, Deerfield, FL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 118 days.

(21) Appl. No.: 16/800,797

(22) Filed: Feb. 25, 2020

(65) Prior Publication Data

US 2021/0264633 A1 Aug. 26, 2021

(51) Int. Cl.
*G06T 7/62* (2017.01)
*G06T 7/00* (2017.01)
*G06F 9/54* (2006.01)
*G06Q 10/08* (2012.01)
*G06T 7/80* (2017.01)

(52) U.S. Cl.
CPC ............. *G06T 7/62* (2017.01); *G06F 9/542* (2013.01); *G06Q 10/0832* (2013.01); *G06T 7/0004* (2013.01); *G06T 7/80* (2017.01); *G06T 2207/10028* (2013.01)

(58) Field of Classification Search
CPC ......... G06K 9/629; G06K 9/6256; G06N 3/08
See application file for complete search history.

(56) References Cited

U.S. PATENT DOCUMENTS

| | | | |
|---|---|---|---|
| 6,778,209 B1 * | 8/2004 | Eversole | H04N 5/2252 348/65 |
| 9,137,511 B1 * | 9/2015 | LeGrand, III | G01B 11/2545 |
| 2004/0240754 A1 | 12/2004 | Smith et al. | |
| 2009/0161884 A1 * | 6/2009 | Render | H04M 3/205 381/66 |
| 2010/0079618 A1 * | 4/2010 | Sato | G06T 3/4053 348/229.1 |
| 2012/0320190 A1 * | 12/2012 | Natroshvili | G06T 7/85 348/135 |

(Continued)

OTHER PUBLICATIONS

International Search Report and Written Opinion for International Application No. PCT/US2021/017687 dated Jul. 12, 2021.

(Continued)

*Primary Examiner* — Myron Wyche

(57) ABSTRACT

A data capture system includes: a first capture node including: a first set of image sensors, and a first computing device connected with the first set of image sensors and configured to: control the first set of image sensors to capture respective images of an object within a capture volume; generate a first point cloud based on the images; and transmit the first point cloud to a data capture server for dimensioning of the object; and a second capture node including: a second set of image sensors, and a second computing device connected with the second set of image sensors and configured to: control the second set of image sensors to capture respective images of the object; generate a second point cloud based on the images; and transmit the second point cloud to the data capture server.

17 Claims, 7 Drawing Sheets

(56) References Cited

U.S. PATENT DOCUMENTS

| | | | |
|---|---|---|---|
| 2016/0078610 A1* | 3/2016 | Rudd | G01B 11/2545 348/87 |
| 2017/0276588 A1 | 9/2017 | Knox et al. | |
| 2019/0009777 A1* | 1/2019 | Cheng | B60W 30/0956 |
| 2019/0246967 A1* | 8/2019 | Pekander | A61B 5/1495 |
| 2020/0202571 A1* | 6/2020 | Barbour | G06T 7/70 |

OTHER PUBLICATIONS

Appia et al. "Surround view camera system for ADAS on TI's TDAxSoCS", Texas instruments, Oct. 2015. Retrieved on May 27, 2021. Retrieved from <URL: https://www.ti.com/lit/wp/spry270a/spry270a.pdf?ts=1622134867366&ref_url=https%253A%252F%252Fwww.google.com%252F> entire document.

* cited by examiner

DATA CAPTURE SYSTEM

BACKGROUND

The transportation and storage of objects such as packages may require knowledge of the dimensions of a package. Such information may be employed to optimize the use of available space in a container (e.g. a trailer), to determine a shipping or storage cost for the package, or the like. Package dimensions, however, may not be known in advance, and workers may therefore be required to obtain package dimensions by manually measuring the packages. Taking manual measurements can be time-consuming and error-prone. Systems for automatically measuring package dimensions may also suffer from reduced accuracy, for example, when measuring packages in motion, packages with dark (e.g. black) surfaces, and the like.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
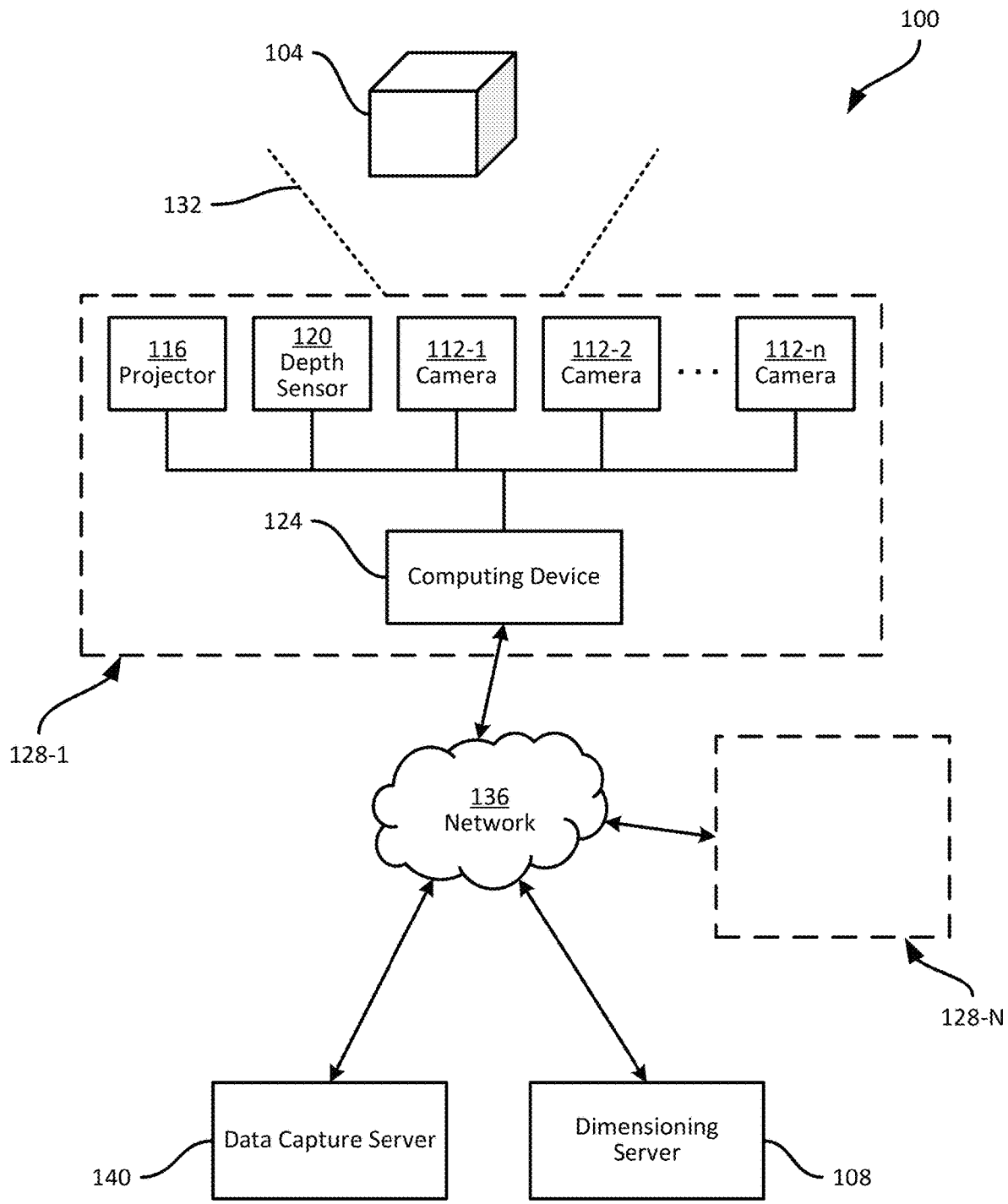
FIG. 1 is a block diagram of an example data capture system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a data capture system including: a first capture node including: a first set of image sensors, and a first computing device connected with the first set of image sensors and configured to: control the first set of image sensors to capture respective images of an object within a capture volume; generate a first point cloud based on the images; and transmit the first point cloud to a data capture server for dimensioning of the object; and a second capture node including: a second set of image sensors, and a second computing device connected with the second set of image sensors and configured to: control the second set of image sensors to capture respective images of the object; generate a second point cloud based on the images; and transmit the second point cloud to the data capture server.

Additional examples disclosed herein are directed to a method of data capture, comprising: determining whether to perform a calibration check for a set of image sensors; when the determination is affirmative, controlling a projector to illuminate a capture volume with virtual fiducial markers; controlling each of a set of image sensors, simultaneously with the illumination, to capture respective images of the capture volume; and determining whether detected positions of the virtual fiducial markers based on the images match expected positions of the virtual fiducial markers; and validating a calibration of the set of image sensors when the determination is affirmative.

Further examples disclosed herein are directed to a computing device, comprising: a memory storing calibration data defining relative positions of a set of image sensors; and a processor configured to: determine whether to perform a calibration check for a set of image sensors; when the determination is affirmative, control a projector to illuminate a capture volume with virtual fiducial markers; control each of a set of image sensors, simultaneously with the illumination, to capture respective images of the capture volume; and determine whether detected positions of the virtual fiducial markers based on the images match expected positions of the virtual fiducial markers; and validate a calibration of the set of image sensors when the determination is affirmative.

FIG. 1 depicts a data capture system 100 for object dimensioning. The data capture system 100 is configured to capture image data depicting an object 104 within a capture volume defined by the system 100. The image data (e.g. a set of two-dimensional images captured substantially simultaneously) can be processed to generate a point cloud representing the object 104 to be dimensioned. Dimensions for the object 104 can then be determined, for example by a dimensioning server 108, based on the point cloud.

The data capture system includes a plurality of image sensors 112-1, 112-2, ... 112-n. The image sensors 112 may also be referred to as cameras 112. The data capture system also includes a projector 116 (in other examples, multiple projectors 116 may be employed) and a depth sensor 120 (in other examples, depth sensors 120 may be employed). The projector 116 is controllable to project a structured light pattern onto the capture volume, to illuminate the object 104. The structured light pattern can be selected to be readily detectable in images captured by the cameras 112, to facilitate generation of the point cloud mentioned above.

The depth sensor 120 can be a depth camera, such as a time-of-flight (TOF) camera, a lidar sensor, or a combination thereof. As will be discussed below in greater detail, the depth sensor 120 is employed to determine certain attributes of the object 104 prior to image capture by the cameras 112. Based on the attributes determined using the depth sensor 120, configuration parameters can be selected for either or both of the projector 116 and the cameras 112.

The data capture system also includes a computing device 124 connected with the cameras 112, the projector 116 and the depth sensor 120. The computing device 124 can control the cameras 112, the projector 116 and the depth sensor 120, and can select the above-mentioned configuration parameters, for example based on rules at the computing device 124. The computing device 124 can also generate a point cloud from the images captured by the cameras 112.

As shown in FIG. 1, the cameras 112, the projector 116, the depth sensor 120, and the computing device 124 are components of a capture subsystem 128-1, also referred to as a capture node 128-1. The data capture system 100 may include a plurality of capture subsystems 128, an example 128-N of which is also shown in FIG. 1. In other words, the data capture system 100 can include a plurality of capture nodes 128 (e.g. four nodes 128, although greater and smaller numbers of nodes 128 can also be deployed). Each node 128 may provide coverage, via a field of view (FOV) 132 of the cameras 112 of that node 128, of a portion of the capture volume, such that the nodes 128 together provide full coverage of the capture volume.

The computing device 124, as well as the respective computing devices of other capture nodes 128, can generate point cloud data from the images captured by the corresponding cameras 112. The partial point clouds generated by each computing device 124 can be provided, e.g. via a network 136, to a data capture server 140. The data capture server 140, in turn, can combine the point clouds received from each node 128 to generate a combined point cloud, from which the object 104 can be extracted and dimensioned by the dimensioning server 108. The dimensioning server 108, for example, can be configured to process the point cloud and determine at least one dimension (e.g. height, width, length or the like) of the object 104.

Figure 2:
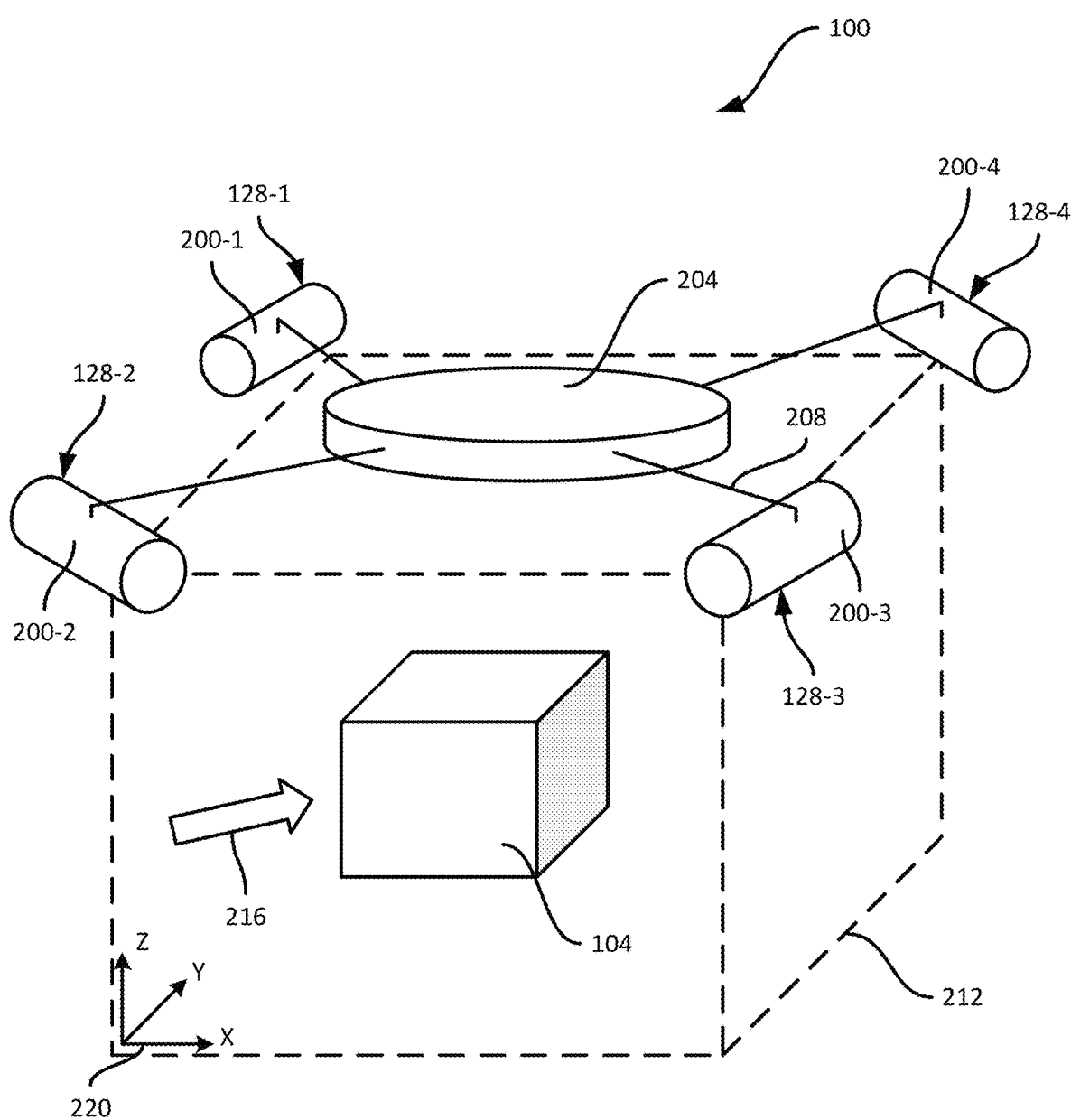
FIG. 2 is a diagram illustrating an example implementation of the data capture system of FIG. 1.

Turning to FIG. 2, certain components of the system 100 are shown in an example deployment. The example deployment shown in FIG. 2 includes four capture nodes 128-1, 128-2, 128-3 and 128-4 (referred to collectively as nodes 128 and generically as a node 128). As discussed above, each node 128 includes cameras 112 and a computing device 124. Each node 128 can also include one or more projectors and/or depth sensors 120, although in some embodiments, certain nodes 128 may omit either or both of the projectors 116 and depth sensors 120.

The components of each node 128 can be contained within a housing 200-1, 200-2, 200-3, 200-4. For example, as illustrated in FIG. 2 the housings 200 can be substantially cylindrical housings, fabricated from any suitable materials to support the components of the respective nodes. The nodes 128 can be supported, e.g. by a central support structure 204, also referred to as a central pod 204, connected with the nodes 128 via conduits 208. The nodes 128 can also be supported by trusses or other support members extending from a ceiling and/or walls (not shown) of the facility, in addition to being connected with the central pod 204 via the conduits 208. The conduits 208 can carry communications and/or power lines (e.g. cabling) and cooling fluid (e.g. conditioned air or the like) from a source of cooling fluid such as the central pod 204 to the housings 200. The central pod 204 can therefore contain cooling or other conditioning equipment, and may also contain either or both of the server 108 and the server 140.

As noted earlier, the cameras 112 of the nodes 128 are positioned such that the field of view of each camera 112 encompasses at least a portion of a capture volume 212, such as a 10×10×10 foot volume. Further, the fields of view of adjacent cameras 112 within each node 128 overlap, e.g. by about 40%. Together, the cameras 112 of the nodes 128 thus provide substantially complete coverage of the capture volume 212 (e.g. each position in the capture volume 212 is within the field of view of at least two cameras 112).

The object 104 may be placed within the capture volume 212 to remain stationary during capture and dimensioning, or the object 104 may be transported through the capture volume 212 in any suitable direction (e.g. the direction 216 indicated in FIG. 2) via any suitable locomotive mechanism. The system 100, in other words, may dimension the object 104 at rest or in motion. Example locomotive mechanisms include a forklift or other vehicle, a conveyor belt, and the like. The system 100 is configured to detect when the object 104 has entered the capture volume 212, and in response to such detection, to control components thereof in order to configure the projectors 116 and cameras 112, capture images with the cameras 112, and generate point cloud data.

In particular, the computing device 124 of each node 128 is configured to generate a point cloud from the images captured by the cameras 112 of that node 128, independently of the other nodes 128. That is, in the example illustrated in FIG. 2, four point clouds may be generated in parallel by the nodes 128, to be combined into a single point cloud by the server 140 for use in dimensioning the object 104.

The point cloud generated by a given node 128 thus depicts a portion of the capture volume 212 corresponding to the FOV 132 of that node 128. The point clouds generated by the nodes 128 may use a local frame of reference specific to each node 128, or may use a common frame of reference 220 established for the capture volume 212 when the system 100 is deployed. When the nodes 128 generate point clouds using the common frame of reference 220, the computing device 124 of each node 128 can store calibration data defining the physical position of the cameras 112 of that node 128 relative to the origin of the common frame of reference 220. When the nodes 128 employ local frames of reference, the server 140 can register the node-specific point clouds to the common frame of reference 220 using the above-mentioned calibration data.

Figure 3:
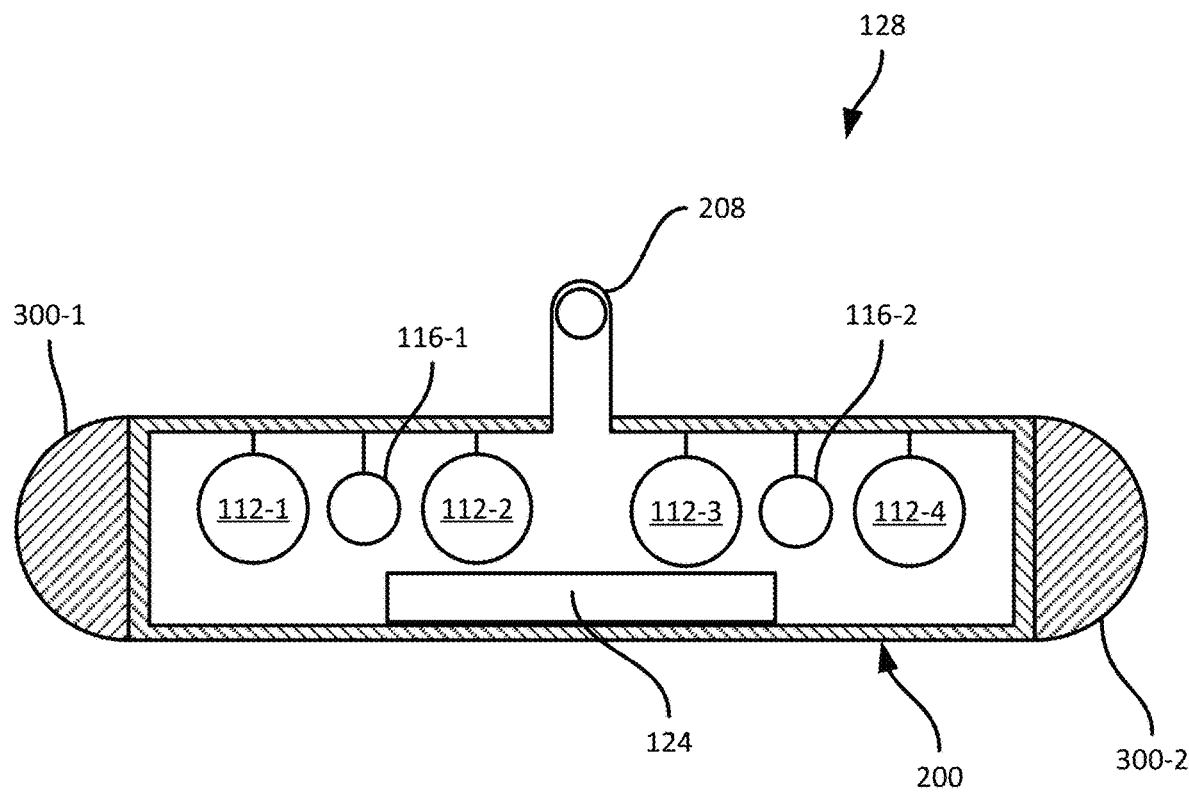
FIG. 3 is a diagram illustrating an example data capture node in the system of FIG. 2.

Turning to FIG. 3, a cross section of a single node 128 is shown to illustrate an example arrangement of components within the housing 200 of the node 128. As seen in FIG. 3, the housing 200 defines an interior space supporting the cameras 112 (four cameras 112-1, 112-2, 112-3 and 112-4 are shown in the present example) and projectors 116-1 and 116-2. The node 128 may include as few as two cameras 112, and may omit the projectors, include a single projector, or include more than two projectors. The node 128 illustrated in FIG. 3 also omits the depth sensor 120. The number of cameras 112 included in a node 128, and the number of nodes 128 in the system 100 can be selected to balance computation speed (with a greater number of nodes, each with its own computing device 124, generally increasing system performance), cost (with each node 128 generally increasing the cost of the system), and accuracy (with a greater number of cameras per node generally increasing accuracy but decreasing performance).

The housing 200 can support the cameras 112, projectors 116 and computing device 124 directly on interior surfaces thereof, of the housing 200 can include an internal frame on which the components of the node 128 can be supported. Cables and the like supplying power and data communications to the cameras 112, projectors 116 and computing device 124 can exit the housing 200 via the conduit 208, towards the central pod 204. The housing 200 includes a slot, a set of windows or the like permitting exposure of the cameras 112 and projectors 116 to the capture volume 212.

The node 128 can also include a notification device, such as indicator lights 300-1 and 300-2. The indicator lights 300 are controllable by the computing device 124 to generate notifications. Example notifications include patterns and colors of illumination to indicate system status and issue instructions to operators, such as the operator of a forklift carrying the object 104. For example, the indicator lights 300 can be controlled to illuminate in a first color (e.g.

green) to instruct the operator to proceed through the capture volume 212, and in a second color (e.g. red) to instruct the operator to return through the capture volume 212, for example when the server 140 determines that a captured point cloud included excessive noise. Control of the lights 300, therefore, can be effected by the computing device 124 on the basis of instructions received at the computing device 124 from the server 140.

Figure 4:
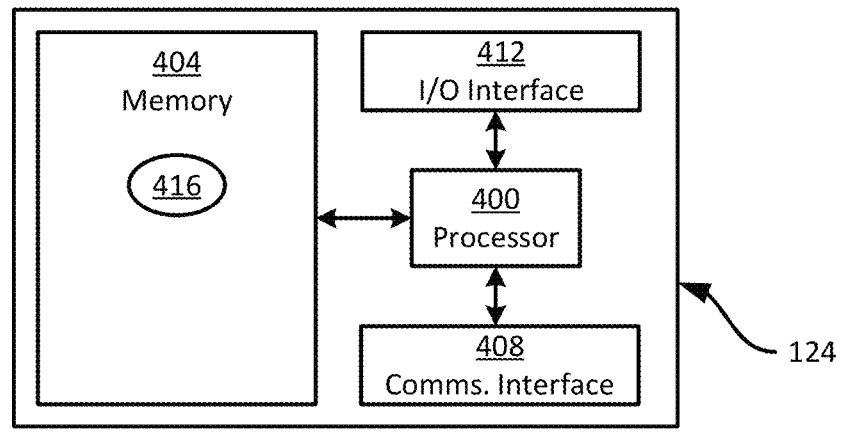
FIG. 4 is a block diagram illustrating certain internal components of the computing device of FIG. 1.

Referring to FIG. 4, certain internal components of the computing device 124 are shown. The computing device 124 includes a central processing unit (CPU), also referred to as a processor 400, interconnected with a non-transitory computer readable storage medium, such as a memory 404. The memory 404 includes any suitable combination of volatile memory (e.g. Random Access Memory (RAM)) and non-volatile memory (e.g. read only memory (ROM), Electrically Erasable Programmable Read Only Memory (EEPROM), flash) memory. The processor 400 and the memory 404 each comprise one or more integrated circuits (ICs).

The computing device 124 also includes a communications interface 408, enabling the computing device 124 to exchange data with other computing devices, such as the dimensioning server 108 and the data capture server 140, via the network 136. The communications interface 408 therefore includes any suitable hardware (e.g. transmitters, receivers, network interface controllers and the like) allowing the computing device 124 to communicate over the network 136.

The computing device 124 further includes an input/output interface 412, which may also be referred to as a local communications interface, enabling the computing device 124 to exchange data with devices such as the cameras 112, projector 116, depth sensor 120, and indicator lights 300. In the present example, the interface 412 includes a universal serial bus (USB) interface. The interface 412 can also include a discrete device, such as a USB hub, connected to the computing device 124. Other suitable interface technologies may also be employed for the interface 412, including Ethernet, Wi-Fi, Thunderbolt™ and the like.

The computing device 124 can also include input devices (e.g. a keyboard, a mouse, a microphone, or the like) and output devices (e.g. a display, a speaker or the like), not shown. The components of the computing device 124 are interconnected by communication buses (not shown), and powered by a battery or other power source, over the above-mentioned communication buses or by distinct power buses (not shown).

The memory 404 of the computing device 124 stores a plurality of applications, each including a plurality of computer readable instructions executable by the processor 400. The execution of the above-mentioned instructions by the processor 400 causes the computing device 124 to implement certain functionality, as discussed herein. The applications are therefore said to be configured to perform that functionality in the discussion below. In the present example, the memory 404 of the computing device 124 stores a point cloud generator application 416 (also referred to herein simply as the application 416).

The computing device 124 is configured, via execution of the application 416 by the processor 400, to control the cameras 112 and projectors 116 to capture a set of images (e.g. simultaneously with illumination of the object 104 with the projectors 116), and to generate point cloud data based on the captured images. The generation of a point cloud from the set of images can be performed according to a suitable set of photogrammetry operations. The computing device 124 is also configured to perform certain additional functions that may increase the accuracy of the resulting point cloud data.

The application 316 can, in other examples, be implemented as multiple discrete applications. In other examples, the processor 400, as configured by the execution of the application 316, is implemented as one or more specifically-configured hardware elements, such as field-programmable gate arrays (FPGAs) and/or application-specific integrated circuits (ASICs).

Figure 5:
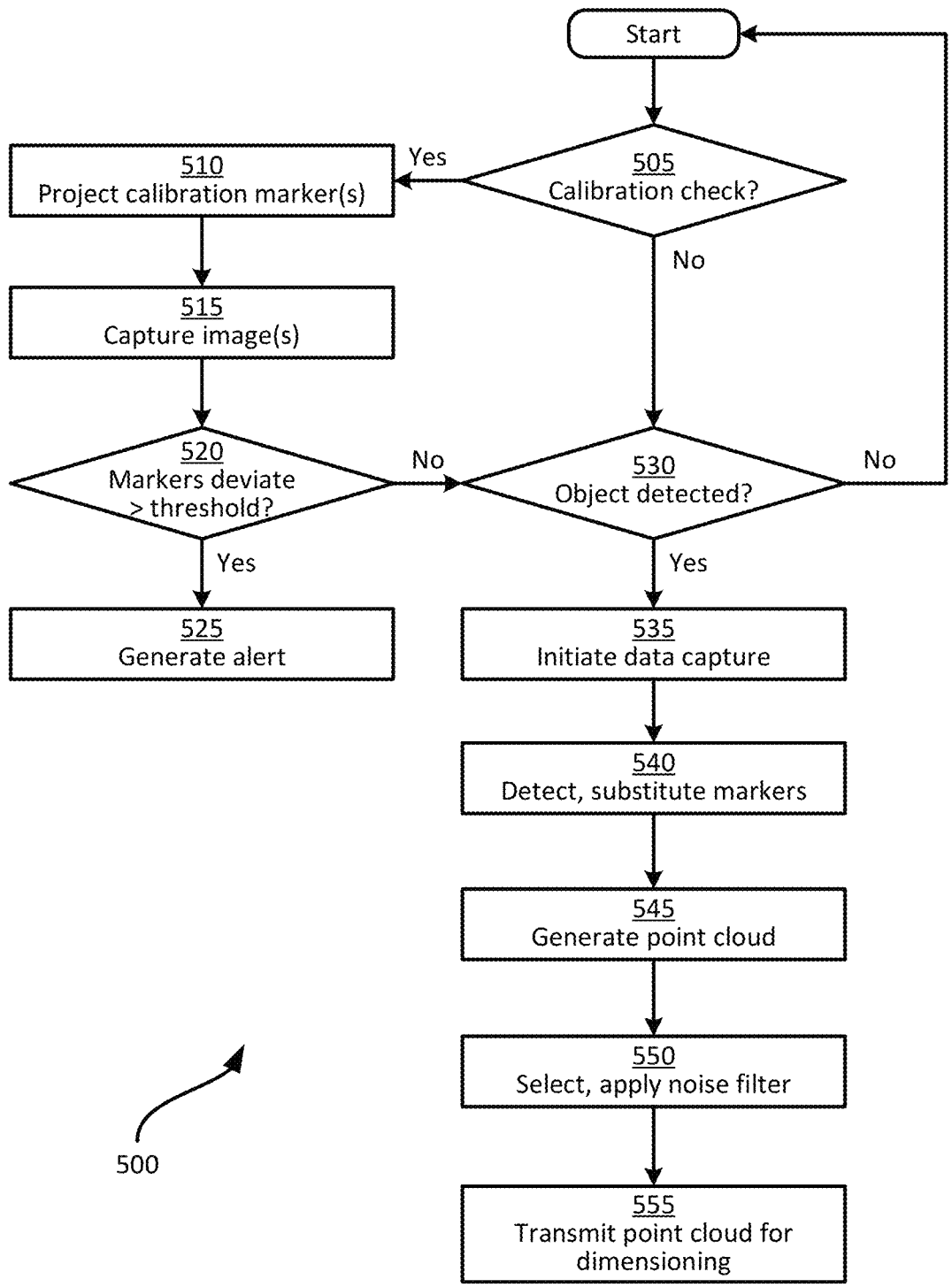
FIG. 5 is a flowchart of a data capture method.

Turning now to FIG. 5, a method 500 of data capture for object dimensioning is illustrated. The method 500 will be described in conjunction with its performance in the data capture system shown in FIGS. 1 and 2. In particular, the method 500 illustrates actions taken by the computing device 124 of each node 128. That is, to obtain a point cloud depicting the capture volume 212 for use in dimensioning the object 104, each node 128 may perform the method 500 in parallel with the other nodes 128, to generate several (four, in the illustrated examples) point clouds which are subsequently combined by the server 140.

At block 505, the computing device 124 is configured to determine whether to perform a calibration check. As noted earlier, the computing device 124 stores calibration data defining the relative positions of the cameras 112 and projectors 116 of the corresponding node 128, as well as the positions of the cameras 112 and projectors 116 relative to the origin of the frame of reference 220. The calibration data is generated when the system 100 is deployed, based on the physical positions at which the nodes 128 and their components are installed in the facility. Impacts or other environmental factors, however, can shift one or more components of a node 128, resulting in a change to the physical position of the node 128 or its components. The calibration data, in such instances, may no longer accurately reflect the true physical positions of the components of the system 100.

When determination at block 505 can be based on a schedule, e.g. defining a frequency at which to perform a calibration check. The frequency can be based on a number of capture operations, or a number of days, hours, or the like. In other examples, the determination at block 505 includes determining whether an instruction has been received (e.g. from an operator of the system 100) to perform the calibration check. Thus, the computing device 124 can determine, at block 505, whether a predefined interval (e.g. in time or in number of data captures) has elapsed.

When the determination at block 505 is negative, the computing device 124 proceeds to data capture operations, as will be discussed in greater detail below. When the determination at block 505 is affirmative, however, the computing device 124 proceeds to block 510.

At block 510, the computing device controls the projectors 116 to project virtual fiducial markers into the capture volume 212 at predetermined positions. For example, the computing device 124 can store a calibration image that contains the virtual markers, and at block 510 can transmit the calibration image to the projector(s) 116 for projection into the capture volume 212.

At block 515, simultaneously with the projection of the calibration image, the computing device 124 controls at least a subset of the cameras 112 of the relevant node 128 to each capture an image of the capture volume 212. As will be apparent, the images captured at block 515 contain at least a portion of the virtual markers projected at block 510. The computing device 124 is configured to identify the virtual markers in the captured images (e.g. based on any one or more of intensity thresholds, edge detections, detecting portions of the images with predefined colors, or the like).

The computing device 124 is then configured, at block 520, to determine whether the positions of the markers in the captured images deviate from the expected positions of the markers, e.g. by more than a predefined threshold. When the determination at block 520 is negative, the computing device 124 can proceed to data capture operations, as discussed below in greater detail. The computing device 124 can also generate a message, signal or the like validating the calibration. When the determination at block 520 is affirmative, however, indicating that calibration of the cameras 112 is no longer accurate, the computing device 124 generates an alert at block 525. The alert can include illumination of the indicator lights 300, transmission of a message to the server 140 or another computing device, or a combination thereof.

Figure 6:
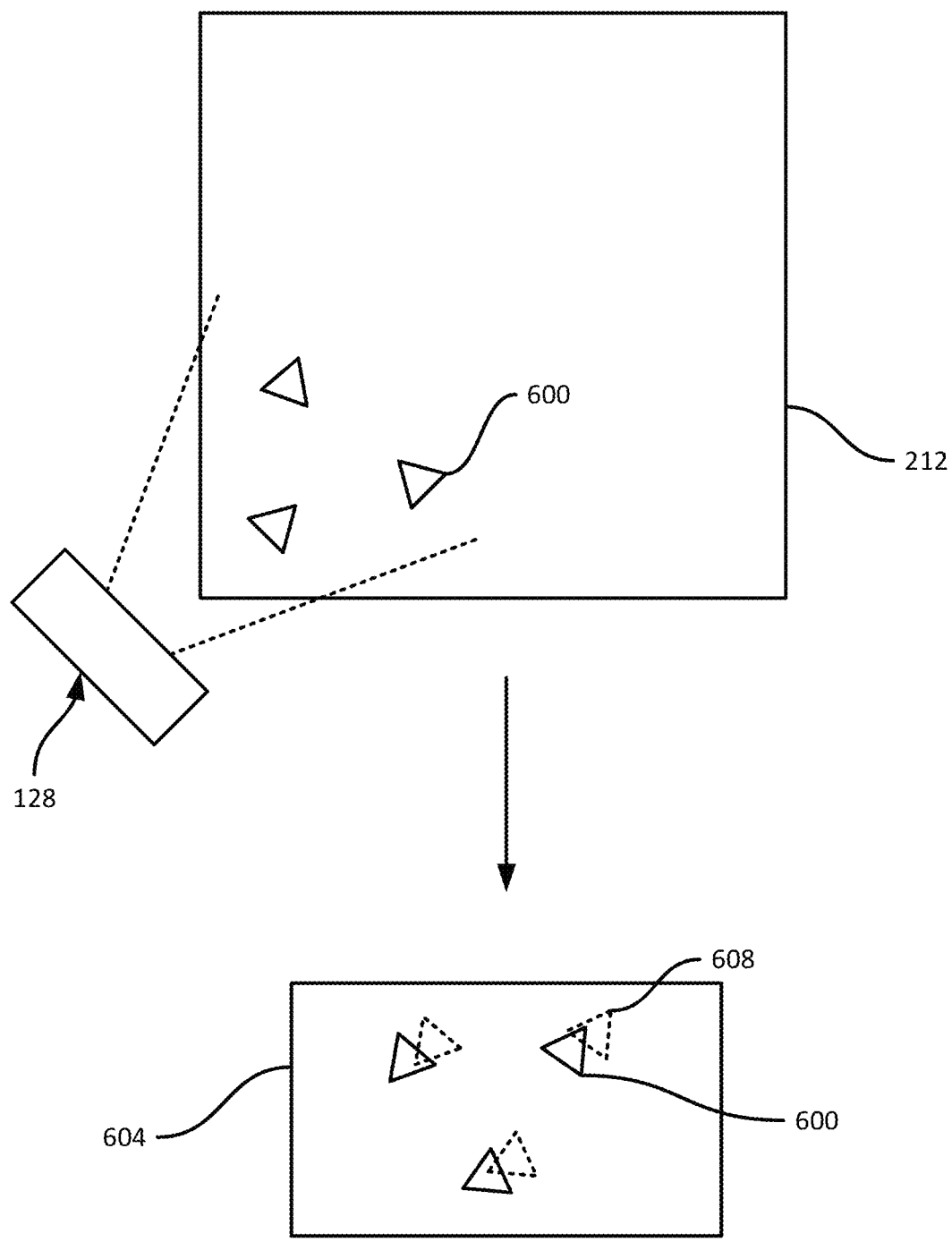
FIG. 6 is a diagram illustrating an example performance of blocks 510-520 of the method of FIG. 5.

FIG. 6 illustrates an example performance of the calibration verification procedure of blocks 510-520. The projection of virtual markers 600 at block 510 is followed by the capture of an image 604 that contains the virtual markers 600. Based on the calibration data and the calibration image, the computing device 124 determines the expected positions 608 of the markers 600, and at block 520 determines a distance between observed and expected positions (i.e. between corresponding pairs of markers 600 and expected positions 608). When the distance determined at block 520 exceeds a threshold, the calibration is considered to have become inaccurate, and an alert is generated at block 525.

Returning to FIG. 5, when the determination at blocks 505 or 520 is negative, the computing device 124 proceeds to block 530, to begin a process of capturing data for point cloud generation.

At block 530, the computing device 124 is configured to determine whether an object (e.g. the object 104) is detected within the capture volume 212, or adjacent to the capture volume 212. In some examples, the computing device 124 controls at least one of the cameras 112 to capture a sequence of images (e.g. a video stream), and processes the sequence of images to detect objects in motion therein. When the processing indicates that an object has entered the capture volume 212, or is approaching the capture volume 212, the determination at block 530 is affirmative. In other examples, the depth sensor 120 can be employed for object detection instead of, or in addition to, the cameras 112 as described above.

In further examples, the determination at block 530 includes determining whether a detection signal has been received at the computing device 124, e.g. from the data capture server 140. For example, the data capture system 100 can include a detection sensor such as a lidar sensor, an IR beam sensor or the like that is triggered when the object 104 enters the capture volume 212. The data capture server 140 can be connected to the detection sensor, and can send the detection signal to the computing device 124 (e.g. to the computing devices 124 of each node 128) when such triggering is detected.

When the determination at block 530 is negative, the computing device 124 continues monitoring for an object detection at block 530. When the determination at block 530 is affirmative, however, the computing device 124 proceeds to block 535.

At block 535 the computing device 124 is configured to control the projector(s) 116 to illuminate the capture volume 212 with a suitable pattern of structured light. The computing device 124 is also configured to control the cameras 112 to capture images simultaneously with illumination of the capture volume 212 by the projector(s) 116. In some examples, prior to performing block 535, the computing device 124 awaits a further detection signal. For example, when the detection at block 530 is that the object 104 is approaching the capture volume 212, at block 535 the computing device 124 can await a detection that the object 104 has entered the capture volume 212.

At block 540, having captured a set of images of the object 104 via control of the cameras 112 and the projectors 116, the computing device 124 can be configured to detect and substitute virtual fiducial markers projected into the capture volume 212 by the projector(s) 116. The virtual fiducial markers detected at block 540 need not be the same as the markers 600 used for calibration. The fiducial markers detected at block 540 are those projected at block 535, and can be selected from a wide variety of markers, based on attributes of the object 104 and/or environmental conditions (e.g. ambient light levels).

Figure 7:
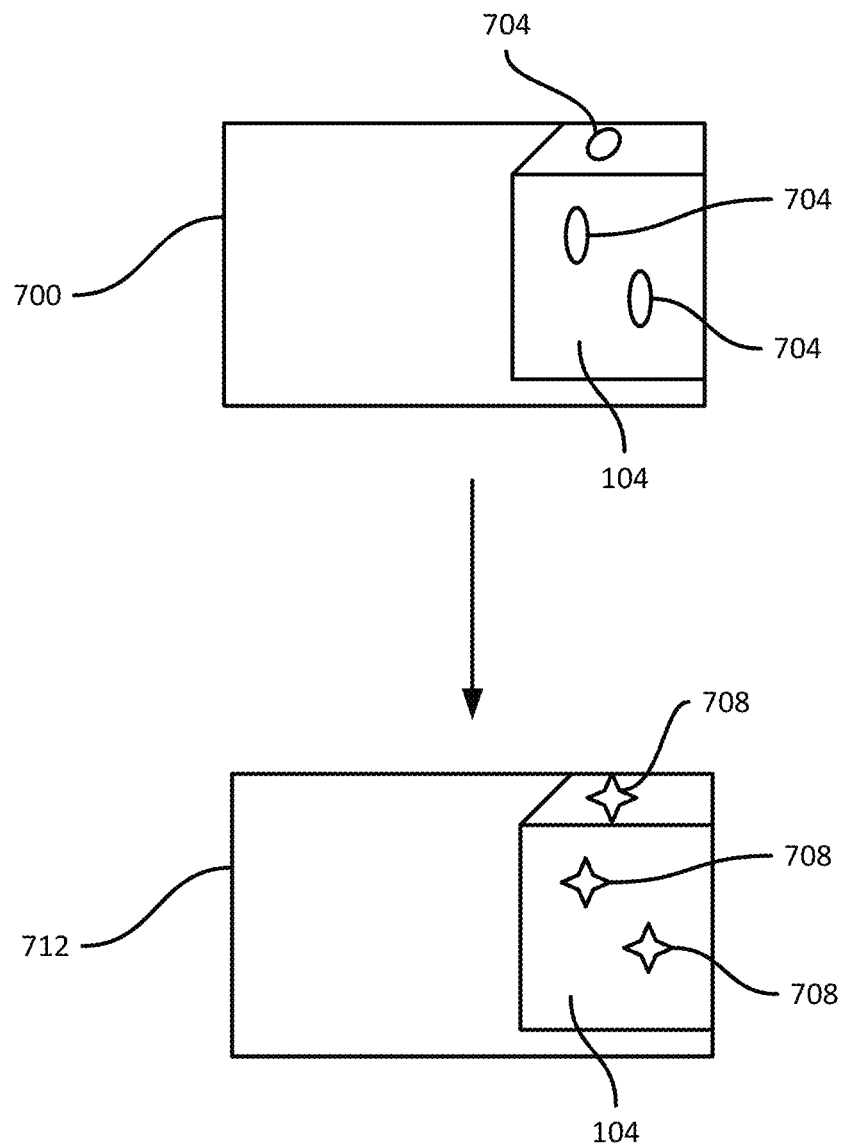
FIG. 7 is a diagram illustrating an example performance of block 540 of the method of FIG. 5.

Turning to FIG. 7, an image 700 captured by one of the cameras 112 of a node 128 is shown, in which virtual markers 704 projected by a projector 116 are visible on the object 104. As seen in FIG. 7, the shapes and sizes of the markers 704 (which may be projected as circles, for example) changes based on which surface of the object 104 they appear on. At block 540, the computing device 124 is configured to detect the markers 704, for example by detecting portions of increased intensity, portions having a certain color, or the like (based on predefined attributes of the markers as emitted by the projector(s) 116). The computing device 124 is then configured to replace the markers 704 with a reference marker 708, as shown in the modified image 712 in FIG. 7. The reference markers 708, as illustrated, do not vary with surface orientation, illumination or the like, and may therefore be more readily detectable by the photogrammetry operations applied later in the method 500. The reference markers 708 may be placed in the image 712 centered on the centroids of the markers 704.

Returning to FIG. 5, at block 545, following insertion of the reference markers 708 into the captured images, the computing device 124 is configured to generate a point cloud from the images (specifically, the modified images, such as the image 712), representing at least a portion of the object 104. As noted above, the point cloud data may be generated at block 545 via application of suitable photogrammetry operations to the images captured at block 535 and modified at block 540.

At block 550, the computing device 124 can be configured to apply a noise filter to the point cloud resulting from the performance of block 545. As will be apparent to those skilled in the art, the point cloud generated at block 545 may include a degree of noise (e.g. points indicating the presence of an object where no object is in fact present). Various suitable noise filters for application to point clouds will occur to those skilled in the art, including for example a bilateral filter. Bilateral filters, in general, adjust attributes of each point (e.g. the position of the point) based on attributes of neighboring points (e.g. based on the distances between the point to be adjusted and its neighbors).

In some examples, the computing device 124 can select between multiple noise reduction operations at block 550. For example, the computing device can generate a noise estimate indicating how noisy the point cloud is, and based on the noise estimate, select between at least two noise reduction operations. For example, if the estimated noise level in the point cloud is above a noise threshold, the computing device 124 can select a first noise filter, and if the estimated noise level is below the threshold, the computing device 124 can select a second noise filter. The first noise filter can be, for example, a bilateral filter, while the second filter can be a less computationally costly mechanism, such as a bilateral filter with an upper boundary on the number of neighbor points to consider in adjusting each point (e.g. 500 neighbors).

When the noise reduction operation is applied at block 550, the computing device 124 can be configured to transmit the point cloud for dimensioning. For example, the point cloud can be transmitted to the data capture server 140, which also receives point clouds from the other nodes 128 and combines the point clouds into a single point cloud representation of the capture volume. The combined point cloud may then be transmitted to the dimensioning server 108, which is configured to detect and dimension the object 104.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A data capture system, comprising:
   a first capture node including:
     a first set of image sensors, and
     a first computing device connected with the first set of image sensors and configured to:
       control the first set of image sensors to capture respective images of an object within a capture volume;
       generate a first point cloud based on the images; and
       transmit the first point cloud to a data capture server; and
   a second capture node including:
     a second set of image sensors, and
     a second computing device connected with the second set of image sensors and configured to:
       simultaneously with control of the first set of image sensors by the first computing device, control the second set of image sensors to capture respective images of the object;
       generate a second point cloud based on the images; and transmit the second point cloud to the data capture server for combination with the first point cloud and dimensioning of the object.

2. The data capture system of claim 1, further comprising:
a first housing supporting the first set of image sensors and the first computing device; and
a second housing supporting the second set of image sensors and the second computing device.

3. The data capture system of claim 2, wherein the first and second housings are substantially cylindrical.

4. The data capture system of claim 1, wherein the first capture node is disposed at a first position adjacent to the capture volume, and wherein the second capture node is disposed at a second position adjacent to the capture volume.

5. The data capture system of claim 1, wherein the first capture node further comprises:
a projector controllable by the first computing device to project a structured light pattern onto the object simultaneously with control of the first set of image sensors.

6. The data capture system of claim 2, wherein the first capture node further comprises:
an indicator light supported by the first housing, the indicator light controllable by the first computing device to generate a notification.

7. The data capture system of claim 2, further comprising:
a first conduit extending from the first housing to carry cooling fluid from a cooling fluid source.

8. The data capture system of claim 7, wherein the first conduit carries communication lines connected to the first computing device.

9. The data capture system of claim 1, further comprising:
a third capture node including:
a third set of image sensors, and
a third computing device connected with the third set of image sensors and configured to:
control the third set of image sensors to capture respective images of the object;
generate a third point cloud based on the images; and
transmit the third point cloud to the data capture server.

10. A method of data capture, comprising:
determining whether to perform a calibration check for a set of image sensors;
when the determination is affirmative, controlling a projector to illuminate a capture volume with virtual fiducial markers;
controlling each of a set of image sensors, simultaneously with the illumination, to capture respective images of the capture volume; and
determining whether detected positions of the virtual fiducial markers based on the images match expected positions of the virtual fiducial markers;
validating a calibration of the set of image sensors when the determination is affirmative;
controlling the projector to illuminate the capture volume with further fiducial markers;
controlling the image sensors to capture a set of images of the capture volume;
detecting the further fiducial markers in the images;
substituting the further fiducial markers in the images with reference markers to generate modified images; and
generating a point cloud based on the modified images.

11. The method of claim 10, wherein determining whether to perform the calibration check includes determining whether a predefined interval has elapsed.

12. The method of claim 10, wherein determining whether the detected positions match the expected positions includes, for each detected position:
determining a distance between the detected position and the expected position; and
determining whether the distance exceeds a validation threshold.

13. The method of claim 10, further comprising:
selecting a noise reduction operation; and
applying the noise reduction operation to the point cloud.

14. A computing device, comprising:
a memory storing calibration data defining relative positions of a set of image sensors; and
a processor configured to:
determine whether to perform a calibration check for a set of image sensors;
when the determination is affirmative, control a projector to illuminate a capture volume with virtual fiducial markers;
control each of a set of image sensors, simultaneously with the illumination, to capture respective images of the capture volume; and
determine whether detected positions of the virtual fiducial markers based on the images match expected positions of the virtual fiducial markers;
validate a calibration of the set of image sensors when the determination is affirmative;
control the projector to illuminate the capture volume with further fiducial markers;
control the image sensors to capture a set of images of the capture volume;
detect the further fiducial markers in the images;
substitute the further fiducial markers in the images with reference markers to generate modified images; and
generate a point cloud based on the modified images.

15. The computing device of claim 14, wherein the processor is further configured, in order to determine whether to perform the calibration check, to determine whether a predefined interval has elapsed.

16. The computing device of claim 14, wherein the processor is further configured, in order to determine whether the detected positions match the expected positions, for each detected position, to:
determine a distance between the detected position and the expected position; and
determine whether the distance exceeds a validation threshold.

17. The computing device of claim 14, wherein the processor is further configured to:
select a noise reduction operation; and
apply the noise reduction operation to the point cloud.

* * * * *